I. E. McCRACKEN.
GEAR CUTTING MACHINE.
APPLICATION FILED DEC. 8, 1913.
1,198,041.
Patented Sept. 12, 1916.
2 SHEETS—SHEET 1.
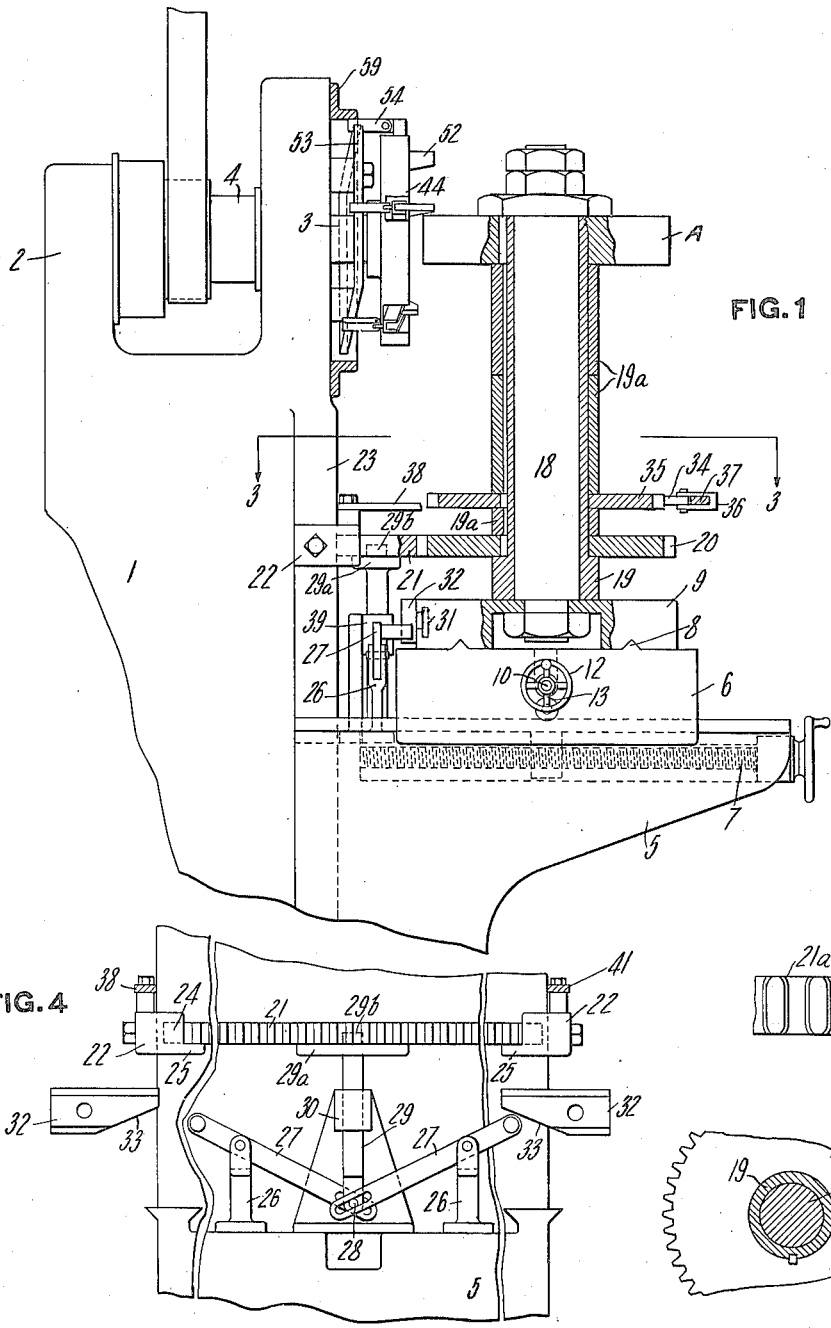
WITNESSES
INVENTOR

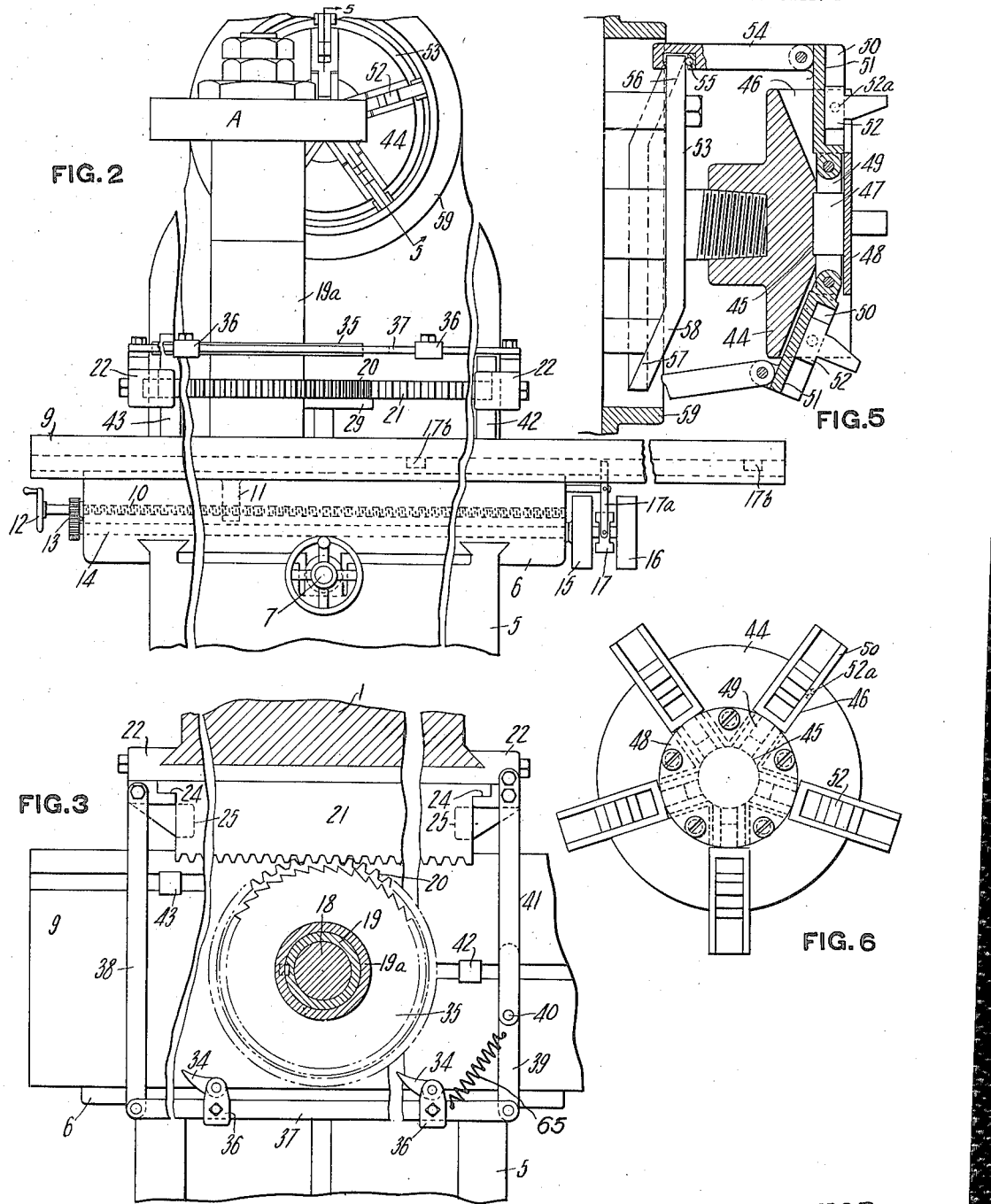

UNITED STATES PATENT OFFICE.

ISAAC E. McCRACKEN, OF PITTSBURGH, PENNSYLVANIA, ASSIGNOR TO GLEASON WORKS, OF ROCHESTER, NEW YORK, A CORPORATION OF NEW YORK.

GEAR-CUTTING MACHINE.

1,198,041.

Specification of Letters Patent. Patented Sept. 12, 1916.

Application filed December 3, 1913. Serial No. 805,325.

*To all whom it may concern:*

Be it known that I, ISAAC E. McCRACKEN, a resident of Pittsburgh, in the county of Allegheny, and State of Pennsylvania, have invented a new and useful Improvement in Gear-Cutting Machines, of which the following is a specification.

This invention relates to apparatus for cutting gears or pinions, and particularly gears or pinions having teeth of modified herring bone type, that is, where the teeth are curved or deviate circumferentially of the gear from end to end from a line parallel with the gear axis.

The invention has particular relation to a machine for carrying out the method and producing the article described in my prior application for method of cutting gears, filed April 4, 1913, Serial No. 758,967.

One object of the invention is to produce a simple machine for carrying out the method of my prior application above identified, and which produces a mathematically correct gear by a true generating operation.

A further object of the invention is to provide a gear cutting machine for cutting curved-tooth gears of any desired form, that is, in which the teeth may have any degree of curvature, irrespective of the diameter of the gear, and, within limits, irrespective of the width of the gear face.

A further object of the invention is to provide a gear cutting machine which is rapid in operation, in which the cutter can not damage the partially formed tooth, and which is entirely automatic in operation.

A further object of the invention is to provide a gear cutting machine of the character described embodying automatic mechanism for traversing the table and for indexing the gear blank between successive cutting operations.

Further objects of the invention are in part obvious and in part will appear more in detail hereinafter.

In the drawings, Figure 1 is a side elevation, partly in section, of one form of machine embodying the invention; Fig. 2 is an end view of the same; Fig. 3 is a sectional plan view on the line 3—3, Fig. 1; Fig. 4 is a detail elevation, showing the master rack operating mechanism; Fig. 5 is in part a side elevation and in part a longitudinal sectional view on the line 5—5, Fig. 2 through the cutter head; Fig. 6 is a front view of the cutter head and indicating the spider in dotted lines; and Fig. 7 is a detail view of the master rack; Fig. 8 is a horizontal sectional view through the arbor 18.

The machine shown in the drawings comprises a frame or base 1 having an upright portion provided with bearings 2 in which the cutter carrying member or spindle 3 is journaled, said spindle being shown as provided with the usual cone pulley or other driving device 4. Spindle 3 projects over a work carrying bed 5 which is preferably adjustable vertically on the frame 1 in the usual manner. Said bed is provided on its upper face with longitudinal ways, extending in a direction parallel with the axis of the spindle 3, along which is movable a work carriage 6. Said carriage may be moved along its ways by any suitable means, such as by a feed screw 7. Carriage 6 is provided on its upper face with guides 8 extending in a direction normal to the axis of the spindle 3 and along which is movable a table or support 9. Said table or support 9 may be moved or traversed along the ways 8 in any suitable manner, such as by a feed screw 10 journaled in the carriage 6 and coöperating with the nut 11 on the table 9. Said feed screw may be operated by a hand wheel 12, but preferably is automatically operated, such as by gears 13 driven by an operating shaft 14, which may be rotated in either direction by suitable means, such as the oppositely rotating driving pulleys 15, 16, and a clutch 17 arranged to couple either one thereof to the shaft. Preferably, suitable mechanism is provided for shifting the clutch 17 at a predetermined point in the travel of the table 9 in each direction, so that the driving mechanism automatically traverses the table back and forth over a path of predetermined length. In the form shown this mechanism comprises a clutch operating lever 17ᵃ fulcrumed on the carriage 6 and arranged to be contacted by two stops 17ᵇ adjustably mounted on the table 9 in any suitable manner so they may be shifted to various positions along the line of movement of the table. The particular form of the carriage reversing mechanism is, however, not essential, and no further description thereof is necessary.

It is well known that straight involute teeth may be generated on an ordinary gear or pinion by rolling the blank past a reciprocating cutter having a cutting tooth or teeth shaped to correspond with the teeth of the "normal rack," in a direction normal to the direction of reciprocation of the cutter and in the plane of the rack. The present machine is designed to generate curved teeth, so that the cutter, instead of reciprocating in a straight line, moves in a curved path in a plane, and is illustrated as rotating about the axis of spindle 3. A rolling motion is produced between the blank and cutter along or on the plane of curved path of movement of the cutter, and in the present machine the blank is rolled along or on a plane transverse to the axis of rotation of the cutter and tangent to the pitch line of the gear to be cut.

Any suitable arrangement of mechanism may be provided for producing the relative rolling motion between the blank and the cutter. As illustrated, table 9 carries a fixed or non-rotatable arbor 18 on which is rotatably mounted a bushing 19 which supports in fixed relation with each other a master gear 20, a ratchet 35 and the blank A to be cut, these three members being spaced apart by short bushings 19ᵃ and being all keyed to and rotatable with the bushing 19. The master gear 20 has the same number of teeth and the same pitch diameter as the gear to be cut, a plurality of said master gears, corresponding to various sizes of gears to be cut being provided for each machine. The master gear 20 rolls along a rack 21, the teeth of which correspond to the teeth of gear 20, and which rack is loosely carried by and is movable vertically in a support 22 adjustable vertically along ways 23 on the upright portion of the fixed frame. The end portions of the rack fit in sockets in members 24 carried on the front face of the support 22 and rest loosely on ledges or shelves 25 on said members 24. Each master gear 20 has a mating master rack 21, and the teeth of each pair are preferably beveled or chamfered at their ends, as shown at 21ᵃ, Fig. 7, for a purpose to be described.

Suitable means is provided for indexing the blank A one step at the conclusion of each cutting operation. In the form shown the bed 5 carries two pillars or supports 26 to each of which is pivoted a lever 27. Said levers have their adjoining end portions slotted to receive a pin 28 connecting them to a lifting member 29, which is slidably mounted in a support 30 on the bed and at its upper end has a wide flat head 29ᵃ engaging the under surface of rack 21 and a projecting end 29ᵇ let into a socket in the rack. The movable table 9 is provided with a longitudinal T-slot 31 in which are adjustably mounted two cams 32, having beveled faces 33 arranged to contact arms on the ends of the levers 27 and oscillate them about their pivots, thereby raising the rack 21 entirely out of engagement with the master gear 20. The cams 32 are adjusted and are secured in the slots 31 in such positions as to contact their respective levers after the blank has rolled completely across the cutting range of the cutting tool.

The indexing movement occurs just after the rack 21 and gear 20 have been wholly disengaged in the manner just described. It is produced, in the machine shown, by either of two spring pressed pawls 34 arranged during the last part of the carriage movement in either direction to engage and rotate the ratchet 35. Each of said pawls is mounted on a carrier 36 adjustable along a swinging bar 37 so it may be located in a position to engage the ratchet at the proper time. One end of bar 37 is pivoted to an arm 38 fulcrumed on the support 22, while its other end is pivotally connected to a lever 39 fulcrumed at 40 to an arm 41 rigidly connected to the support 22. Two stops 42, 43, longitudinally adjustable in slots in the table 9 produce the indexing movement. When the carriage moves in one direction stop 42 strikes lever 39 and moves the bar 37 to the left in Fig. 3. When the carriage moves in the other direction stop 43 strikes lever 38 near its fulcrum and swings its outer end to the left in Fig. 3 and in advance of the carriage, said lever and the bar 37 being returned to normal position by any suitable spring device, such as the spring 65 shown in Fig. 3, and which connects the bar 37 to lever 39. Said spring is stretched each time the bar 37 moves to the left. At each of these times one of the pawls 34 is in contact with the ratchet 35 and the mechanism is so proportioned that before the carriage movement is reversed the blank is indexed approximately one tooth. The blank is accurately indexed or positioned on the backward movement of the carriage, when the cam 33 moves away from the lever 27 and allows the rack 21 to drop. The chamfered ends of the teeth of rack 21 and gear 20 allow for slight variation in the indexing movement produced by the pawls 34, and the rack 21 is preferably heavy enough so that in dropping into engagement its teeth act as wedges to rotate the blank into final accurately indexed position.

As described in my prior application above identified, the gear teeth are generated by two cutters, one of which forms the convex sides of the teeth and the other the concave sides thereof. Each of these cutters may be a single tooth cutter fixedly secured to the spindle 3 with its generating cutting edge at the proper distance from the axis thereof, or each cutter may be in the form of a hollow milling cutter as described in said application. Preferably, however, a special form of cutter head is used, wherein the cutter or cutters may be held in proper cutting relation to the blank when moving across its face in one direction and may be withdrawn from cutting relation with the blank when passing across the same in the other direction. This prevents any liability of the cutters injuring the blank or a partially formed tooth thereof during the backward sweep of the cutter, and also enables the blank to be traversed entirely across the cutting head, and produces a tooth of any desired degree of curvature irrespective of the diameter of the blank or the width of its face. Any suitable form of cutting head which produces these results may be used, but in the form shown in the drawings the cutting head comprises a disk or plate 44 threaded or otherwise rigidly secured to the rotatable spindle 3 and provided with a socket or seat 45 in its front face, from which extend a plurality of radially disposed slots or openings 46, five being shown. Within the socket 45 is located a spider 47 rigidly held therein by a plate 48 screwed to the plate 44, said spider being provided with a plurality of circumferentially spaced pairs of ears or lugs 49, one pair thereof lying in each of the radial slots 46. Between each pair of ears or lugs 49 is pivoted a cutter carrying arm 50, having a longitudinal seat 51 in its front face to receive the base of the cutter 52. Said cutters may be rigidly clamped in the seats 51 by any suitable means, such as by set screws 52ª and may be adjusted to any radial position in said arms. The upright portion of the base or frame 1 has rigidly secured thereto an annular cam 53, which surrounds the spindle 3. Each arm 50 has pivotally connected to its outer end a cutter moving member, shown as a link 54, which is notched or socketed at its rear end to embrace the periphery of cam 53. Each link is preferably provided with an anti-friction member, shown as a ball 55, which takes the thrust of the cam and decreases the friction. The bottoms of the radial slots 46 are inclined, so that the levers 50 have considerable movement therein. Cam 53 is shaped to provide two plain portions, marked respectively 56 and 57, which lie in different planes normal to the spindle axis. These two portions of the cam are connected by inclined cam parts 58.

In operation the members 54 travel around the periphery of the cam 53 and are moved back and forth thereby in a direction lengthwise of the spindle axis, the cutters being successively moved into and out of cutting relation with the blank. Portion 56 of the cam holds the cutters in fixed cutting relation with the blank while they travel across its face in one direction. Cam portion 57 holds the cutters out of cutting relation with the blank while they travel across its face in the other direction, and inclined cam parts 58 move the cutters back and forth between these two positions. The cutter moving members 54 may be held in engagement with the cam by any suitable means, such as by a ring 59 secured to the frame and surrounding said members.

In use of the machine a master gear 20 is chosen having a pitch diameter and number of teeth corresponding to the gear to be cut, and a master rack is selected to correspond with said gear. The blank is rigidly secured to the bushing 19 and the cams 32 are secured in the proper adjusted positions on the table 9. A set of cutters 52 arranged to cut either the concave or convex sides of the teeth is secured in the pivoted arms 50 at the proper distance from the axis of spindle 3. The machine is started by throwing clutch 17 into engagement with one of the pulleys 15 or 16 to move the table 9 in one direction along its ways, such as from left to right in Fig. 2. The blank rolls across the rotating cutters which engage with the work and generate one side face of a tooth. These cutters cross the face of the blank twice during each rotation around the axis of spindle 3, but are only in cutting relation with the blank in crossing the same in one direction, being withdrawn by the cam 52 on the back sweep. When the blank has rolled clear across the cutter head, a cam 32 lifts the rack 21 out of engagement with the gear 20 and one of the pawls 34 indexes the blank approximately one tooth. Clutch 17 is then thrown by a stop 17ᵇ into engagement with the other driving pulley and the carriage movement is reversed. When the cam 32 moves out of engagement with its lever the rack 21 drops into engagement with gear 20 and the bushing 19 is rotated slightly to bring the blank into accurately indexed position. The blank then makes a return traverse across the cutters and the face of the next tooth is generated, the machine cutting as effectively when the blank rolls in one direction as when it rolls in the other. At the end of the return movement of the carriage the other cam 32 disengages the rack and gear and the blank is indexed a second step by the second pawl 34, in the manner before described.

Successive operations proceed around the entire blank and then the first set of cutters is removed and a second set of cutters for forming the other face of the teeth is substituted therefor. The blank is then rotatably adjusted about its axis and with reference to the master gear and ratchet a distance equal to one-half the circular pitch. Successive cutting operations are then performed with the second set of cutters in the same manner as with the first set, thereby generating the other faces of the teeth and finishing the gear.

It is to be understood that the invention is not limited to the particular form of machine shown in the drawings, which is merely illustrative of one embodiment of the invention, except as required by the scope of the appended claims. It is the relative motions between the blank and cutter which are essential and not the absolute motions which occur in the particular machine described.

The machine described is simple and produces all of the necessary motions for generating curved teeth with mathematically correct lines. It may be operated entirely automatically and produces gears at a high speed and consequently at low cost. Moreover, the particular arrangement of cutter head avoids the liability of damaging the blank or any partially formed teeth thereof and permits the formation of teeth having any degree of curvature irrespective of the diameter of the blank or the width of its face.

What I claim is:

1. A gear cutting machine, comprising a support, a cutter carrying spindle journaled therein, a blank carrying member movable on said support to traverse the blank past the cutter, rack and gear connections between said blank carrying member and support for rotating the blank as it travels past the cutter, and means for disengaging said rack and gear connections after the blank has moved beyond the cutter.

2. A gear cutting machine, comprising a support, a spindle rotatable therein and carrying a cutter eccentrically mounted thereon, a rack on said support, a blank carrying member movable on said support to traverse the blank past the cutter and carrying a gear rolling along said rack, and means arranged to disengage the rack and gear and index the blank at the conclusion of the cutting operation.

3. A gear cutting machine, comprising a support, a spindle rotatable therein and carrying a cutter eccentrically mounted thereon, a rack on said support, a blank carrying member movable on said support to traverse the blank past the cutter and carrying a gear rolling along said rack, and automatic means controlled by the carriage movement for disengaging said rack and gear and indexing the blank.

4. A gear cutting machine, comprising a cutter, a blank carrying member, means for moving said cutter in a curved path in a plane tangent to the pitch line of the blank, means for producing relative rolling motion between said cutter and blank on said plane, and means for moving the cutter toward and from the blank during the rolling motion.

5. A gear cutting machine, comprising a cutter, a blank carrying member, means for moving said cutter in a curved path in a plane tangent to the pitch line of the blank, means for producing relative rolling motion between said cutter and blank on said plane, and means for holding the cutter in fixed cutting relation with the blank when traveling across the same in one direction and out of cutting relation therewith when traveling across the same in the other direction.

6. In a gear cutting machine, in combination, means for supporting the blank, a pivoted tool support, and tool thereon arranged to move in a path concentric to the axis of the support, adjusting means for varying the radial position of the tool relatively to the support pivot, and means for moving the tool support on its pivot to effect the cut in the blank.

7. In a gear cutting machine, in combination, means for supporting the blank, a pivoted tool support and tool thereon arranged to move in a path concentric to the axis of the support, adjusting means for varying the radial position of the tool relatively to the support pivot, adjusting means for varying the position of the support pivot relatively to the blank, and means for moving the tool support on its pivot to effect the cut in the blank.

8. In a gear cutting machine, in combination, means for supporting the blank, a pivoted tool support and tool thereon arranged to move in a path concentric to the axis of the support, adjusting means for varying the radial position of the tool relatively to the support pivot, means for adjusting the support pivot toward and away from the axis of the blank, and means for moving the tool support on its pivot to effect the cut in the blank.

In testimony whereof, I have hereunto set my hand.

ISAAC E. McCRACKEN.

Witnesses:
GLENN H. LERESCHE,
WILLIAM B. WHARTON.